United States Patent
Kullborg et al.

(10) Patent No.: US 10,207,412 B2
(45) Date of Patent: Feb. 19, 2019

(54) PLATFORM INCLUDING AN INDUSTRIAL ROBOT

(71) Applicant: ABB Schweiz AG, Baden (CH)

(72) Inventors: Camilla Kullborg, Västerås (SE); Harald Staab, Laufach (DE); Jan Nyqvist, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/751,091

(22) PCT Filed: Aug. 10, 2015

(86) PCT No.: PCT/EP2015/068326
§ 371 (c)(1),
(2) Date: Feb. 7, 2018

(87) PCT Pub. No.: WO2017/025123
PCT Pub. Date: Feb. 16, 2017

(65) Prior Publication Data
US 2018/0229373 A1    Aug. 16, 2018

(51) Int. Cl.
*B25J 11/00* (2006.01)
*B25J 5/00* (2006.01)
(Continued)

(52) U.S. Cl.
CPC .......... *B25J 11/0025* (2013.01); *B25J 5/007* (2013.01); *B25J 9/0009* (2013.01); *B25J 9/0027* (2013.01);
(Continued)

(58) Field of Classification Search
None
See application file for complete search history.

(56) References Cited

U.S. PATENT DOCUMENTS

| 4,887,016 A | 12/1989 | Malick |
| 5,215,202 A | 6/1993 | Fujimoto |

(Continued)

FOREIGN PATENT DOCUMENTS

| CN | 101259614 A | 9/2008 |
| CN | 101293539 A | 10/2008 |

(Continued)

OTHER PUBLICATIONS

International Preliminary Report on Patentability Application No. PCT/EP2015/068326 dated Nov. 7, 2017 7 pages.
(Continued)

*Primary Examiner* — Bentsu Ro
(74) *Attorney, Agent, or Firm* — Whitmyer IP Group LLC

(57) ABSTRACT

A platform including at least one industrial robot, wherein the platform is arranged to be carried by a vehicle to a working site where the at least one industrial robot is to perform a task in relation to the working site. The platform includes a platform body, a platform control unit and a connecting arrangement with a connecting device arranged to be connected to a vehicle arm of the vehicle such that the platform can be carried by the vehicle arm of the vehicle. The connecting arrangement further includes an actuator arranged to cause the platform to rotate around an axis X-X defined by the connecting device according to instructions from the platform control unit. A vehicle including the platform is also described.

20 Claims, 3 Drawing Sheets

(51) Int. Cl.
  *B25J 9/00* (2006.01)
  *B25J 19/00* (2006.01)
  *B25J 19/02* (2006.01)

(52) U.S. Cl.
  CPC ............ *B25J 9/0087* (2013.01); *B25J 19/005* (2013.01); *B25J 19/022* (2013.01); *B25J 19/023* (2013.01); *B25J 19/026* (2013.01)

(56) References Cited

U.S. PATENT DOCUMENTS

| | | | |
|---|---|---|---|
| 5,286,159 A | 2/1994 | Honma | |
| 5,413,454 A | 5/1995 | Movsesian | |
| 5,959,423 A * | 9/1999 | Nakanishi | A47L 11/305 |
| | | | 15/319 |
| 6,325,749 B1 | 12/2001 | Inokuchi et al. | |
| 8,965,571 B2 | 2/2015 | Peters et al. | |
| 2004/0016112 A1* | 1/2004 | Eriksson | B23K 37/047 |
| | | | 29/700 |
| 2008/0093131 A1 | 4/2008 | Couture et al. | |
| 2009/0018690 A1* | 1/2009 | Negre | G05B 19/0426 |
| | | | 700/117 |
| 2011/0257786 A1 | 10/2011 | L'Ecuyer et al. | |
| 2013/0011234 A1* | 1/2013 | Pretlove | B25J 5/005 |
| | | | 414/749.1 |
| 2013/0325182 A1 | 12/2013 | Setrakian et al. | |
| 2015/0177194 A1* | 6/2015 | Xu | G01N 29/043 |
| | | | 73/641 |

FOREIGN PATENT DOCUMENTS

| | | |
|---|---|---|
| CN | 201744997 U | 2/2011 |
| CN | 102601782 A | 7/2012 |
| CN | 203974635 U | 12/2014 |
| GB | 2128842 A | 5/1984 |
| JP | S5941531 A | 3/1984 |
| JP | H1070911 A | 3/1998 |
| JP | 3352230 B2 | 12/2002 |
| PL | 401532 A1 | 5/2014 |
| RU | 2260124 C1 | 9/2005 |
| RU | 2487007 C1 | 7/2013 |
| WO | 2013068824 A1 | 5/2013 |
| WO | 2015024579 A1 | 2/2015 |

OTHER PUBLICATIONS

International Search Report & Written Opinion of the International Searching Authority Application No. PCT/EP2015/068326 completed date: Apr. 18, 2016; dated Apr. 25, 2016 12 pages.

* cited by examiner

PLATFORM INCLUDING AN INDUSTRIAL ROBOT

TECHNICAL FIELD

The present disclosure relates to the field of technology for industrial robots, and in particular to a platform including at least one industrial robot, and a vehicle including the platform.

BACKGROUND

Industrial robots are nowadays an obvious part of a production site performing repetitive and sometimes heavy working tasks. The robots can work day and night and provide cost competitive products. Conventionally, the robot is bolted to the floor or movable along a rail, and thereby bound to a permanent position or area at a working site where the robot is to perform the working task. An industrial robot is however a rather expensive purchase, and it may be an advantage if the robot can be used for different working tasks at different locations.

In U.S. Pat. No. 4,887,016 A a system is described for allowing one robot to perform working tasks at a plurality of work locations. The robot is fixedly mounted on a pallet, and a fork lift can transport the pallet and the robot mounted thereon to a work station. A control enclosure with a robot controller may be secured to the pallet. When placed at the work station, the robot uses a loose position sensor for relating itself relative to the work station.

In some areas humans still do working tasks that are in need of safe solutions. Preferably, humans should not be present at a working site where dangerous working tasks are to be done. Because of the complexity of the working tasks, the inaccessibility of the working location and because of costs, these tasks have not immediately been considered for robot applications. Robots are able to perform more and more complicated tasks, for example because of more advanced technology and new accessories for the robots. However, because of poor accessibility for industrial robots at certain working sites many dangerous working tasks are still performed by humans.

SUMMARY

It is an object of the disclosure to provide an improved solution such that an industrial robot may be able to independently perform work at a working site that is remote and difficult to access. It is a further object of the disclosure to provide a platform for an industrial robot that can give the industrial robot an extended area it can reach. This object and others are at least partly achieved by the platform according to the independent claim, and by the embodiments according to the dependent claims.

According to a first aspect, the disclosure relates to a platform including at least one industrial robot. The platform is further arranged to be carried by a vehicle to a working site where the at least one industrial robot is to perform a task in relation to the working site. The platform includes a platform body, a platform control unit and a connecting arrangement. The connecting arrangement includes a connecting device arranged to be connected to a vehicle arm of the vehicle such that the platform can be carried by the vehicle arm of the vehicle. The connecting arrangement further includes an actuator arranged to cause the platform to rotate around an axis X-X defined by the connecting device according to instructions from the platform control unit.

The platform gives enhanced possibilities to perform work with industrial robots at working sites that are not easily accessible. The connecting arrangement may extend the working area of at least one industrial robot of the platform, without need for any prearranged installation at the working site. A vehicle with a regular vehicle arm can be used, and there is thus no need for any changes to the vehicle that is to carry the platform or purchase of new specially adopted vehicles. Different kinds of industrial robots can be included in the platform as needed.

The platform can be used for tasks such as charging, cleaning, mounting or attaching construction details, maintenance of ventilation etc. at difficult-to-access and unsafe locations. Further application areas may be mines, tunnels, plant constructions, unhealthy or dangerous production environments including high sulfur content oil wells, heavy work, maintenance and construction work at heights, or above ground level (change the bulbs in street lights, tasks in warehouses etc. with high stacking heights), airplane de-icing, airplane inspection etc.

According to one embodiment, the platform includes at least one tool holder for keeping tools necessary for the at least one industrial robot to perform the task.

According to one embodiment, the platform includes at least one magazine for material necessary for the at least one industrial robot to perform the task.

The platform may thus carry all the tools and material necessary for performing the working task at the working site, which of course is very convenient when in a remote and difficult-to-access place.

According to one embodiment, the platform includes an energy storage or energy generator for supplying the platform with energy. Then, the platform and the included at least one industrial robot may be energized also in remote or difficult-to-access places without the need for arranging a power cable to the platform.

According to one embodiment, the platform body has an elongated shape with at least one long side and two short sides, wherein the connecting device is arranged to one long side of the platform body, and at least one short side is arranged to hold one of the at least one industrial robots. This shape gives a large working area for one or two industrial robots attached to the short side or sides of the platform.

According to one embodiment, each of the short sides of the platform body is arranged to hold one industrial robot.

According to one embodiment, the connecting arrangement includes a bearing arrangement to enable rotation of the platform around the axis X-X.

According to one embodiment, the platform body is arranged with at least one holding arrangement for movably holding the at least one industrial robot to the platform body.

According to one embodiment, wherein the at least one industrial robot is fixedly attached to the platform body.

According to one embodiment, the platform is configured to be remotely controlled.

According to one embodiment, the platform includes two industrial robots.

According to one embodiment, the platform includes a sensing system.

According to one embodiment, the platform control unit includes a memory unit and a processing unit, the memory unit storing a location of the at least one tool holder and a location of the at least one magazine in relation to a robot coordinate system of the at least one industrial robot. Thus, the at least one industrial robot knows the location of the tools in the tool holder and any material in the magazine.

According to one embodiment, the at least one industrial robot is configured to be remotely controlled.

According to a third aspect, the disclosure relates to a vehicle including a platform.

DETAILED DESCRIPTION

Figure 1:
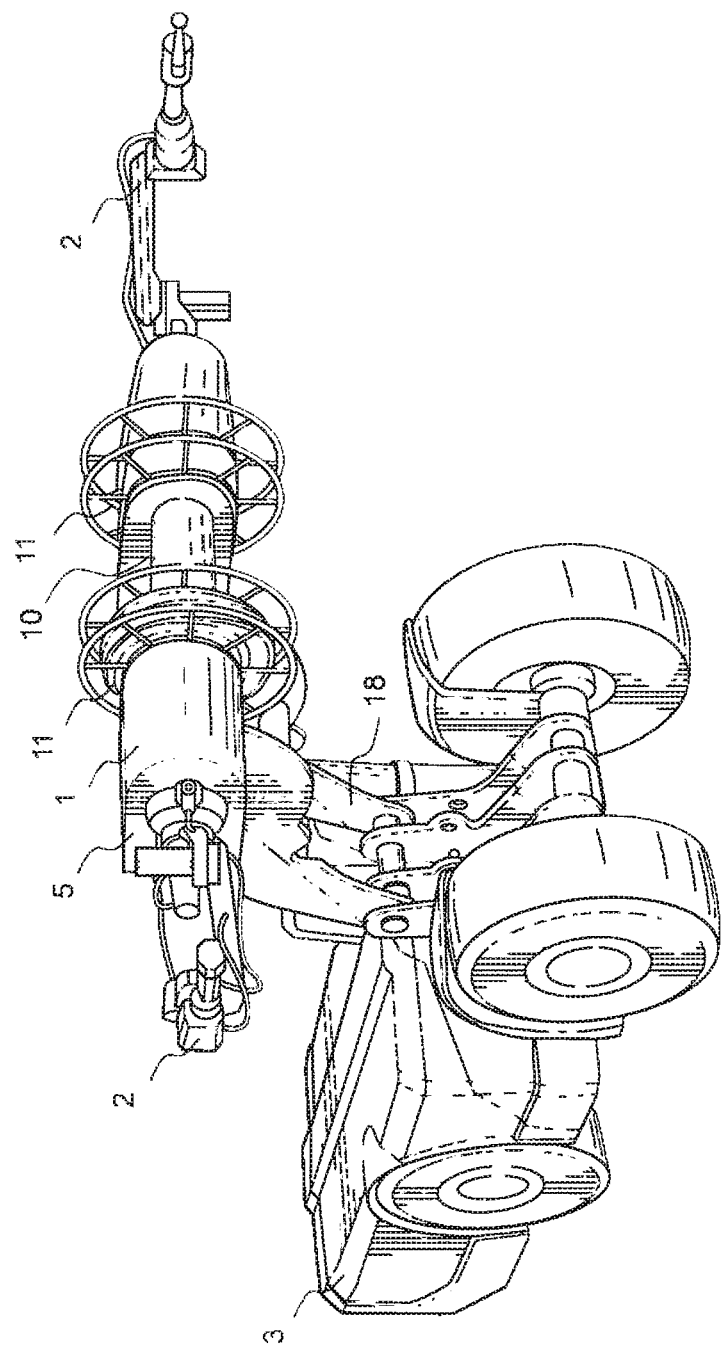
FIG. 1 shows the platform according to one embodiment lifted up on a vehicle arm of an autonomous vehicle.

In FIG. 1 a platform 1 according to one embodiment is illustrated when carried and lifted up from the ground by an autonomous vehicle 3. The platform 1 includes at least one industrial robot 2. In the figures the platform 1 has two industrial robots 2 each arranged to an opposite side of a platform body 5 of the platform 1. The at least one industrial robot 2 may e.g. be a six degrees of freedom (DOF) robot, a seven DOF robot etc. In the context of this disclosure the term "industrial robot" refers to an automatically controlled, reprogrammable, multipurpose manipulator with a plurality of DOFs and an ability to perform work tasks independently. The platform 1 is arranged to be carried by the vehicle 3 to a working site 4 (FIG. 2) where the at least one industrial robot 2 is to perform a task in relation to the working site 4. The at least one industrial robot 2 may be fixedly attached to the platform body 5, e.g. with bolts. Alternatively, the at least one industrial robot 2 may be movably attached to the platform body 5, e.g. on rails. The platform 1 is further arranged with at least one tool holder 10 for keeping tools necessary for the at least one industrial robot 2 to perform the task or tasks at the working site 4. The tools may e.g. be different kinds of grippers or processing tools for the industrial robot 2. The platform 1 in FIG. 1 is further arranged with process equipment in the form of hose reels 11 with hoses, here one hose reel 11 is designated for each industrial robot 2. The hoses may be drawn out by the industrial robots 2, and thereafter retracted again automatically by the hose reels 11. The platform 1 may be arranged with other kinds of process equipment including e.g. a tank with material or a compressor. The at least one industrial robot 2 may use material from the tank, and/or a process tool that is driven by gas from the compressor.

Instead of having an autonomous vehicle 3, the platform 1 may be carried by a manually driven vehicle. Both the autonomous vehicle and the manually driven vehicle are hereafter commonly referred to as "vehicle 3".

The vehicle 3 has a vehicle arm 18 that is controlled from the vehicle 3. The vehicle arm 18 can be raised and lowered, and may be jointed as shown in FIG. 1 for increased movability. The vehicle arm 18 may be forked or may have any other kind of arrangement such that the outermost part of the vehicle arm 18, e.g. the fork or forks, can be attached to the platform 1 in order to carry the platform 1 to the working site 4. At the working site 4 the vehicle 3 may simply put down the platform 1, withdraw the vehicle arm 18 such that the forks or other arrangement is removed from the platform 1, and drive away from the working site 4. The vehicle 3 may e.g. drive away to a safer place than the working site 4, to a parking place or to deploy another platform 1. Thus, the vehicle 3 and its vehicle arm 18 are totally removable from the platform 1 without any manual intervention. Further, the vehicle 3 may autonomously attach the vehicle arm 18 to the platform 1 thus without any manual intervention.

Figure 2:
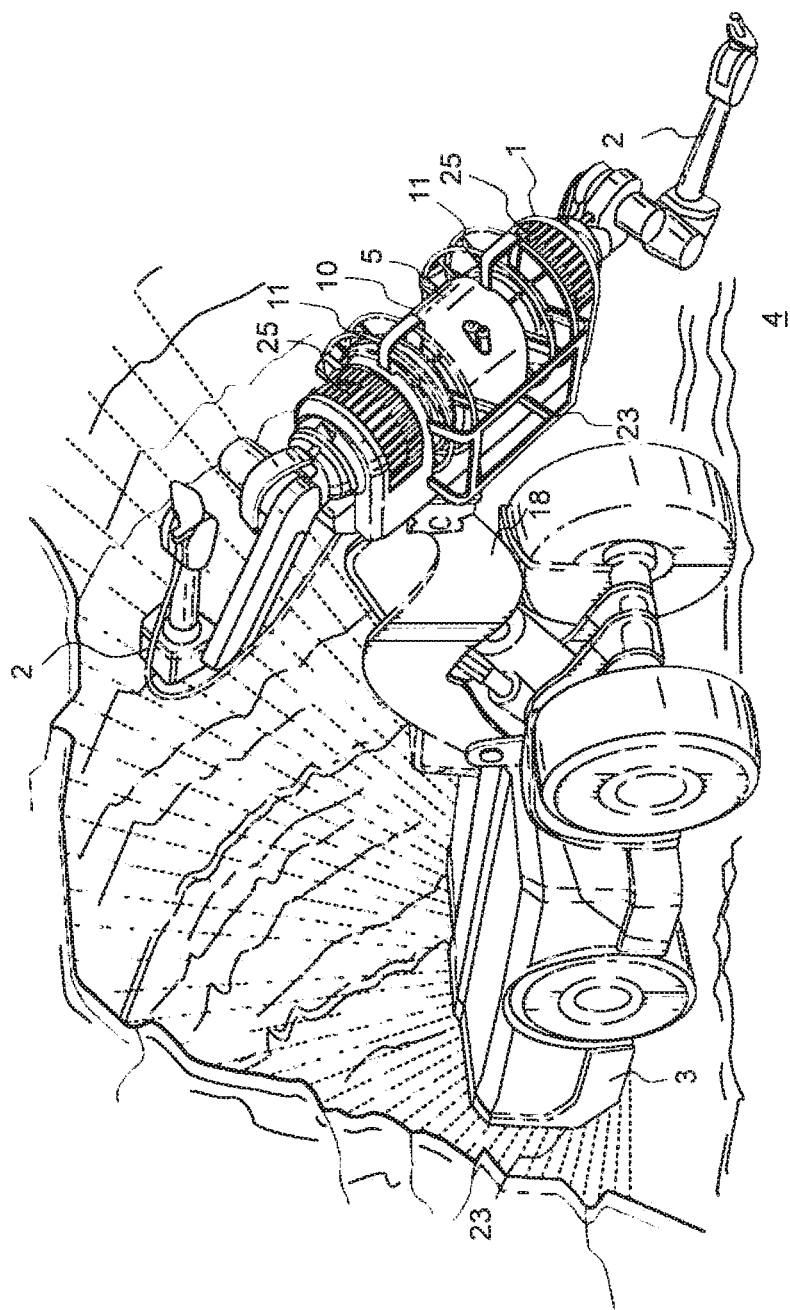
FIG. 2 shows the platform according to another embodiment lifted up on the vehicle arm of the autonomous vehicle and rotated.

Instead of leaving the platform 1 at the working site 4, the vehicle 3 may aid the at least one industrial robot 2 of the platform 1 in performing a task at the working site 4. In such case movements of the vehicle 3 are preferably co-ordinated with movements of the platform 1 and of the at least one industrial robot 2 in order on one hand to prevent movements of the vehicle 3 at critical phases of the task and on the other hand to allow movements enabling the task. FIG. 2 is showing the vehicle 3 carrying the platform 1 in a mine at the working site 4. The vehicle 3 uses lights 23 to light up the mine. The platform 1 is very flexible as it can retract the industrial robot 2 to minimize the size of the platform 1, and is thereby easy to move around by the vehicle 3 in the mine. In similarity with the platform 1 in FIG. 1, the platform 1 shown in FIG. 2 includes the platform body 5 and two industrial robots 2 fixedly attached to opposite sides of the platform body 5. The platform 1 is further arranged with one tool holder 10, two magazines 25 with detonators and primers, and two hose reels 11 with hoses. One magazine 25 and one hose reel 11 with hose are designated for each industrial robot 2. The platform 1 according to the embodiment shown in FIG. 2 is arranged for a charging application where the industrial robots 2 will prepare a site in the mine with explosives, a very dangerous task that at present is performed by humans.

As previously explained, the platform 1 may include at least one magazine 25 for material necessary for the at least one industrial robot 2 to perform the task. The at least one magazine 25 may be configured to make automated tasks such as pre-assembling of material to be used at the working site 4. The pre-assembling may be sensor based, that is, a sensing system 14 (FIG. 4) may be arranged to monitor the pre-assembling and to guide the magazine 25 in the pre-assembling. The at least one magazine 25 may then be arranged with actuators (not shown) etc. in order to perform the pre-assembling. The pre-assembling may include to put together two or more material parts. In the embodiment shown in FIG. 2, the magazines 25 are configured to assemble the primers and the detonators in the magazines 25, and present the assemblage to the at least one industrial robot 2, respectively.

In FIG. 2 the platform 1 is shown when the platform 1 is rotated around an axis X-X extending along and defined by a connecting device 8 (FIG. 4) of the platform 1. The platform 1 is thus rotatable in relation to the forks or other arrangement of the vehicle arm 18 now attached to the platform 1 for carrying the platform 1. For example, the platform 1 may be rotatable around the forks or other arrangement of the vehicle arm 18. It should be noted that none of the vehicle 3 or the vehicle arm 18 are active in rotating the platform 1. Further, none of the industrial robots 2 included in the platform 1, e.g. any axes of the industrial robots 2, are active in rotating the platform 1. The rotation is controlled and actuated by the platform 1 itself. However, the vehicle 3 is needed to lift the platform 1 from the ground in order to make it possible to rotate the platform 1. By means of the rotation capability of the platform 1, the at least one industrial robot 2 may reach a much larger working area than if the platform 1 could not be rotated. The industrial robot 2 may therefore perform tasks more efficiently in a surrounding where space is limited, e.g. in the mine. Further, the area of reach for the industrial robots 2 is not limited by the height the vehicle arm 18 can reach. The platform 1 is particularly suitable for use when dangerous tasks should be performed. Several tasks in a mine are dangerous, for example a charging process when explosives are arranged, that today is done manually by hand. This process can now be performed by the industrial robots 2 of the platform 1. The platform 1 may further include a rack 23 to support the platform body 5 when placed on ground. The rack 23 is here designed to have a rectangular shape intended to rest on the ground, and to have a plurality of legs extending from the rectangular shape against the platform body 5 and attached to the platform body 5. Alternatively, the rack 23 may include a plurality of legs extending from the platform body 5 directly to the ground.

Figure 3:
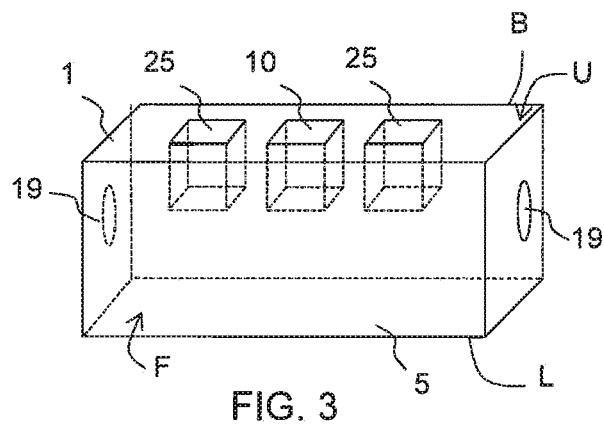
FIG. 3 shows a perspective view of the platform according to one embodiment from the front.

An embodiment of the platform 1 is shown in more detail in FIGS. 3 and 4 and will now be explained with reference thereto. The manipulators of the industrial robots 2 are here removed for simplicity. In FIG. 3 the platform 1 is shown from a perspective view of a long front side F of the platform 1. The platform body 5 of the platform 1 is here shown having an outer elongated shape, here rectangular cuboid, with four long sides and two short sides. The platform body 5 may instead have other shapes such as cylindrical, cubical or spherical. The platform bodies 5 of the platforms 1 in FIGS. 1 and 2 have mainly outer rectangular shapes. The platform body 5 of the platform 1 in FIGS. 3 and 4 further has a long back side B opposite the front side F, and a long upper side U and a thereto opposite long lower side L. On the two opposite short sides, holding arrangements 19 are shown for the industrial robots 2, whereto the manipulators of the industrial robots 2 may be arranged. The holding arrangements 19 may e.g. have prearranged bolts whereto the manipulators of the industrial robots 2 could be fixedly attached. The holding arrangement or arrangements 19 may instead include rails (not shown) such that the industrial robots 2 can be movably arranged to the platform 1. The holding arrangements 19 may be located on any of the sides of the platform 1. The rails may thus be located along any of the sides of the platform 1. The movement of the at least one industrial robot 2 may be controlled by the platform control unit 6 or the robot control unit 15, and actuated via an actuator e.g. a motor (not shown). The platform body 5 of the platform 1 further has a tool holder 10 and two magazines 25 located on the upper side U of the platform body 5. The tool holder 10 is located in-between the two magazines 25 to make the latter easily accessible for both the industrial robots 2 when arranged to the short sides of the platform body 5. The tool holder 10 and the magazines 25 may however be differently arranged, e.g. on the front side F, the back side B or the short sides. Processing equipment may also be included in the platform 1.

Figure 4:
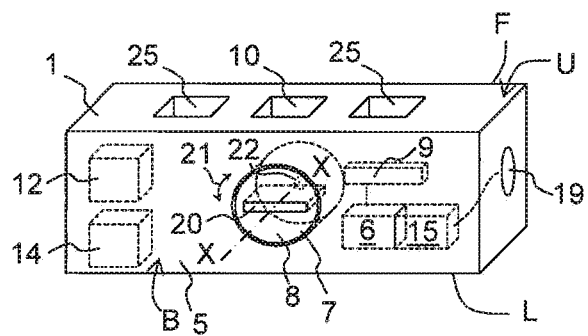
FIG. 4 shows a perspective view of the platform according to one embodiment from behind.
Figure 5:
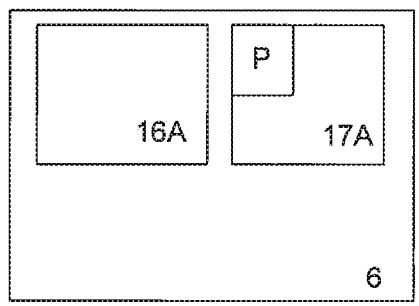
FIG. 5 illustrates a platform control unit according to one embodiment.

In FIG. 4 the platform 1 is shown from the opposite side as in FIG. 3, thus from a perspective view of the back side B. From this side B parts of a connecting arrangement 7 of the platform 1 can be seen. The connecting arrangement 7 includes a connecting device 8 arranged to be connected to the vehicle arm 18 of the vehicle 3 such that the platform 1 can be carried by the vehicle arm 18 of the vehicle 3. The connecting arrangement 7 further includes an actuator 9 arranged to cause the platform 1 to rotate around an axis X-X defined by the connecting device 8 according to instructions from a platform control unit 6. The platform control unit 6 is arranged in the platform 1. The platform control unit 6 is shown in greater detail in FIG. 5, including a memory unit 17A and a processing unit 16A. The memory unit 17A is storing a platform control program P. When the platform control program is run, the platform 1 rotates as instructed from the program. The direction of rotation is shown in FIG. 4 by the arrow 21. The platform 1 may be arranged to rotate between 0 to ±180 degrees, for example between 0 to ±90 degrees or between 0 to ±45 degrees. The platform control unit 6 may also be arranged to control other devices or units in the platform 1. For example, the platform control unit 6 may be arranged to control the process equipment, the movement of the at least one industrial robot 2 along the holding arrangement 19, the sensing system 14 (FIG. 4) or a light system (not shown) of the platform 1.

The connecting device 8 may be arranged in a cylinder shaped hole of the platform body 5. The platform body 5 is then rotatable arranged around the connecting device 8, around the hole. The actuator 9 is further arranged to cause the platform body 5 to rotate about the connecting device 8. The connecting device 8 may be arranged with a groove 20 where a fork of the vehicle arm 18 may be inserted to carry the platform 1. The connecting device 8 may be arranged with any other kind of conventional coupling arrangement for coupling the vehicle arm 18 to the connecting device 8. For example, the connecting device 8 may be arranged with two protrusions (not shown) protruding horizontally in opposite directions along the platform body 5. The protrusions may be hanged on a mating gripper (not shown) on the vehicle arm 18 such that the platform 1 can be carried by the vehicle arm 18 on the gripper. The connecting arrangement 7 may further include a bearing arrangement 22 to enable rotation of the platform 1 about the axis X-X.

The connecting arrangement 7 may also include a locking feature (not shown) for locking the platform 1 to the vehicle arm 8. The locking feature helps securing the platform 1 to the vehicle arm 18 during rotation of the platform 1.

The platform 1 may further include an energy storage or energy generator 12 for supplying the platform 1 with energy, for example supplying the actuator 9, the platform control unit 6, the at least one industrial robot 2 and/or the sensing system 14 etc with energy. The energy storage may be a battery. Alternatively, the energy generator may be a diesel power generator. Cables (not shown) necessary for transferring the energy from the energy storage or energy generator 12 to the different units of the platform 1 are then arranged to the platform 1. The platform 1 may also be provided with a plug in socket (not shown), to which a power cable can be connected.

Figure 6:
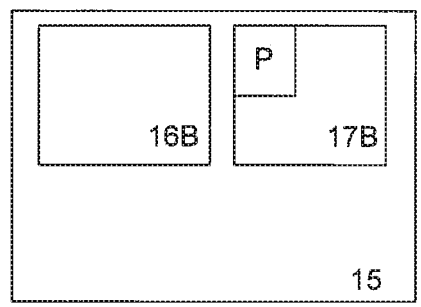
FIG. 6 illustrates a robot control unit according to one embodiment.

The platform 1 may further comprise one or several robot control units 15. The one or several robot control units 15 may thus be arranged to, or incorporated into, the platform body 5. The robot control unit 15 is arranged to control the at least one industrial robot 2 according to a robot control program P. FIG. 6 is illustrating a robot control unit 15 in greater detail, and includes a memory unit 17B and a processing unit 16B. The memory unit 17B may store the location of the at least one tool holder 10, and of the at least one magazine 25 and process equipment in relation to a robot coordinate system of the at least one industrial robot 2. The memory unit 17B also stores the robot control program. When the robot control program is run, the industrial robot 2 performs the task included in the program, and is able to find tools in the tool holder 10, and material in the magazines 25 and process equipment by means of the stored relation in the memory unit 17B. Alternatively, the memory unit 17A in the platform control unit 6 may store the location of the tool holder 10, and of the magazine 25 and of the process equipment in relation to the robot coordinate system of the at least one industrial robot 2.

The platform 1 may further include the sensing system 14. The sensing system 14 may be configured to locate the at least one industrial robot 2 at the working site 4. The sensing system 14 may include a camera unit, a video recording unit, a radar unit and/or a laser unit (not shown). The unit or units are arranged to send data to the robot control unit 15 where the data is processed. The data may be sent via wires (not shown) or by wireless communication. The at least one industrial robot 2 and thus the platform 1 may then be located in relation to the working site 4. The industrial robots 2 may instead include a separate sensing system (not shown) by means of which the industrial robots 2 can locate themselves at the working site 4. The platform 1 may be configured to be remotely controlled. That is, all items that may be included in the platform 1, i.e. the sensing system 14, the process equipment, the magazines 25, the platform control unit 6 and/or the robot control unit(s) 15, the actuator 9, the at least one industrial robot 2 etc., may be configured to be remotely controlled.

The platform 1 may include a communication unit (not shown) in order to receive instructions and to send data to and from a remote controller (not shown) in order to control the platform 1. The remote instructions are transferred to any appropriate or both of the control units 6, 15.

One of the platform control unit 6 and the robot control unit 15 may be the main control unit, and the other control unit a slave control unit. For example, if the robot control unit 15 is the main control unit, the platform control unit 6 is the slave control unit and waits for instructions from the robot control unit 15 before it executes its own program. Instead, the platform control unit 6 may be the main control unit, and the robot control unit 15 the slave control unit. Of course, the platform control unit 6 and the robot control unit 15 may be incorporated into one common control unit that is arranged to control the platform 1 and all included parts of the platform 1. Also, the industrial robots 2 may be controlled by one robot control unit 15 each.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A platform including two industrial robots, wherein the platform is arranged to be carried by a vehicle to a working site where the two industrial robots are to perform a task in relation to the working site, the platform includes a platform body; and wherein the platform further includes a platform control unit and a connecting arrangement with a connecting device arranged to be connected to a vehicle arm of the vehicle such that the platform can be carried by the vehicle arm of the vehicle, the connecting arrangement further includes an actuator arranged to cause the platform to rotate around an axis X-X defined by the connecting device according to instructions from the platform control unit, and wherein the platform body has an elongated shape with at least one long side and two short sides, wherein the connecting device is arranged to one long side of the platform body, and wherein each of the short sides holds one of the two industrial robots.

2. The platform according to claim 1, including at least one tool holder for keeping tools necessary for the at least one industrial robot to perform the task.

3. The platform according to claim 2 including at least one magazine for material necessary for the at least one industrial robot to perform the task.

4. The platform according to claim 2, including an energy storage or energy generator.

5. The platform according to claim 2, wherein the connecting arrangement includes a bearing arrangement to enable rotation of the platform around the axis X-X.

6. The platform according to claim 2, wherein the platform body is arranged with at least one holding arrangement for movably holding the at least one industrial robot to the platform body.

7. The platform according to claim 1, including at least one magazine for material necessary for the at least one industrial robot to perform the task.

8. The platform according to claim 1, including an energy storage or energy generator.

9. The platform according to claim 1, wherein the connecting arrangement includes a bearing arrangement to enable rotation of the platform around the axis X-X.

10. The platform according to claim 1, wherein the platform body is arranged with at least one holding arrangement for movably holding the at least one industrial robot to the platform body.

11. The platform according to claim 1, wherein at least one industrial robot is fixedly attached to the platform body.

12. The platform according to claim 1, wherein the platform is configured to be remotely controlled.

13. The platform according to claim 1, including a sensing system.

14. The platform according to claim 1, wherein the platform control unit includes a memory unit and a processing unit, the memory unit storing a location of the at least one tool holder and a location of the at least one magazine in relation to a robot coordinate system of the at least one industrial robot.

15. The platform according to claim 1, wherein the at least one industrial robot is configured to be remotely controlled.

16. A vehicle including a platform for carrying two industrial robots to a working site, wherein the platform is arranged to be carried by a vehicle to a working site where the two industrial robots are to perform a task in relation to the working site, the platform includes a platform body; and wherein the platform further includes a platform control unit and a connecting arrangement with a connecting device arranged to be connected to a vehicle arm of the vehicle such that the platform can be carried by the vehicle arm of the vehicle, the connecting arrangement further includes an actuator arranged to cause the platform to rotate around an axis X-X defined by the connecting device according to instructions from the platform control unit, and wherein the platform body has an elongated shape with at least one long side and two short sides, wherein the connecting device is arranged to one long side of the platform body, and wherein each of the short sides holds one of the two industrial robots.

17. The vehicle according to claim 16, wherein the vehicle and its vehicle arm are totally removable from the platform.

18. The vehicle according to claim 17, wherein the vehicle is arranged to autonomously attach the vehicle arm to the platform.

19. The vehicle according to claim 16, wherein the vehicle is arranged to autonomously attach the vehicle arm to the platform.

20. The vehicle according to claim 16, wherein the vehicle is configured to co-ordinate movements of the vehicle with movements of the platform and movements of the two industrial robots.

\* \* \* \* \*